(12) United States Patent
Jeong et al.

(10) Patent No.: US 11,590,950 B2
(45) Date of Patent: *Feb. 28, 2023

(54) ELECTRIC BRAKE SYSTEM AND OPERATING METHOD THEREOF

(71) Applicant: HL MANDO CORPORATION, Gyeonggi-do (KR)

(72) Inventors: Hyojin Jeong, Gyeonggi-do (KR); Seong Ho Choi, Gyeonggi-do (KR); Jin Seok Kim, Gyeonggi-do (KR); Byung Ki Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 771 days.

This patent is subject to a terminal disclaimer.

(21) Appl. No.: 16/395,234

(22) Filed: Apr. 26, 2019

(65) Prior Publication Data
US 2019/0329750 A1 Oct. 31, 2019

(30) Foreign Application Priority Data

Apr. 26, 2018 (KR) .......................... 10-2018-0048456
Apr. 26, 2018 (KR) .......................... 10-2018-0048461
May 30, 2018 (KR) .......................... 10-2018-0061882

(51) Int. Cl.
*B60T 13/66* (2006.01)
*B60T 13/68* (2006.01)
(Continued)

(52) U.S. Cl.
CPC .......... *B60T 13/662* (2013.01); *B60T 8/1755* (2013.01); *B60T 8/4081* (2013.01); *B60T 13/686* (2013.01); *B60T 13/745* (2013.01); *B60T 15/028* (2013.01)

(58) Field of Classification Search
CPC .... B60T 13/662; B60T 8/1755; B60T 8/4081; B60T 13/686; B60T 13/745; B60T 15/028
See application file for complete search history.

(56) References Cited

U.S. PATENT DOCUMENTS 5,988,768 A * 11/1999 Schaefer ............... B60T 8/3655
303/114.1
6,033,036 A 3/2000 Rüffer et al.
(Continued)

FOREIGN PATENT DOCUMENTS

| | | |
|---|---|---|
| EP | 2 520 473 | 11/2012 |
| JP | 2008-265450 | 11/2008 |

(Continued)

OTHER PUBLICATIONS

Extended European Search Report dated Jun. 18, 2019 for European Application No. 19171273.6.
(Continued)

*Primary Examiner* — Yazan A Soofi
*Assistant Examiner* — Naeem Taslim Alam
(74) *Attorney, Agent, or Firm* — Ladas & Parry, LLP

(57) ABSTRACT

Provided are an electronic brake system and a method of operating the same, capable of performing a normal operation mode and an abnormal operation mode by including an integrated master cylinder configured to discharge a pressurizing medium according to a displacement of a brake pedal while providing a driver with a pedal fee, a liquid pressure supply device configured to generate a liquid pressure by operating a hydraulic piston according to an electrical being output on the basis of the displacement of the brake pedal, and a hydraulic control unit configured to a liquid pressure of a pressurizing medium to be supplied to each wheel cylinder.

15 Claims, 5 Drawing Sheets

(51) Int. Cl.
*B60T 13/74* (2006.01)
*B60T 15/02* (2006.01)
*B60T 8/1755* (2006.01)
*B60T 8/40* (2006.01)

(56) References Cited

U.S. PATENT DOCUMENTS

| | | | | |
|---|---|---|---|---|
| 6,135,575 A | * | 10/2000 | Feigel | B60T 8/4863 303/114.1 |
| 6,354,673 B1 | | 3/2002 | Feigel et al. | |
| 7,331,641 B2 | * | 2/2008 | Kusano | B60T 13/74 303/114.1 |
| 8,434,831 B2 | * | 5/2013 | Yang | B60T 8/409 60/576 |
| 9,964,128 B2 | * | 5/2018 | Kistner | B60T 13/146 |
| 2004/0004392 A1 | * | 1/2004 | Kusano | B60T 13/148 303/114.1 |
| 2004/0061375 A1 | * | 4/2004 | Drott | B60T 7/042 303/20 |
| 2005/0001476 A1 | * | 1/2005 | Kusano | B60T 17/04 303/113.4 |
| 2010/0181825 A1 | * | 7/2010 | Drumm | B60T 8/4077 303/122.13 |
| 2013/0213023 A1 | | 8/2013 | Eckstein et al. | |
| 2013/0213025 A1 | | 8/2013 | Linden | |
| 2014/0265547 A1 | | 9/2014 | Ganzel | |
| 2015/0035353 A1 | | 2/2015 | Drumm | |
| 2015/0097418 A1 | * | 4/2015 | Koo | B60T 11/20 303/14 |
| 2015/0137588 A1 | * | 5/2015 | Koo | B60T 13/662 303/14 |
| 2017/0106846 A1 | * | 4/2017 | Kim | B60T 13/662 |
| 2019/0152456 A1 | * | 5/2019 | Schiel | B60T 8/38 |
| 2019/0329751 A1 | * | 10/2019 | Jeong | B60T 8/1755 |

FOREIGN PATENT DOCUMENTS

| | | |
|---|---|---|
| JP | 2010-126037 | 6/2010 |
| JP | 2010-137617 | 6/2010 |
| JP | 5126039 | 1/2013 |
| KR | 10-2015-0040714 | 4/2015 |
| KR | 10-2015-0055644 | 5/2015 |
| KR | 10-2017-0031394 | 3/2017 |
| KR | 10-2017-0066726 | 6/2017 |

OTHER PUBLICATIONS

Office Action dated Oct. 20, 2022 for Korean Patent Application No. 10-2018-0048456 and its English translation from Global Dossier.

* cited by examiner

ELECTRIC BRAKE SYSTEM AND OPERATING METHOD THEREOF

CROSS-REFERENCE TO RELATED APPLICATION

This application is based on and claims priority under 35 U.S.C. § 119 to Korean Patent Applications No. 2018-0048456, filed on Apr. 26, 2018, No. 2018-0048461, filed on Apr. 26, 2018, and No. 2018-0061882, filed on May 30, 2018 in the Korean Intellectual Property Office, the disclosures of which are incorporated herein by reference.

BACKGROUND

1. Field

The present invention relates to an electronic braking system and a method of operating the same, and more specifically, to an electronic braking system for generating braking force using an electrical signal corresponding to a displacement of a brake pedal and a method of operating the same.

2. Description of the Related Art

Vehicles are essentially provided with A brake system for braking, and in recent years, various types of systems to obtain more powerful and stable braking force have been proposed.

Examples of the brake system include an Anti-Lock Brake System (ABS) for preventing skid of wheels at the time of the braking, a brake traction control system (BTCS) for preventing slip of driving wheels at the time of a sudden acceleration incident or an unintended acceleration, and an electronic stability system (ESC) implemented as a combination of an ABS and a traction control to maintain a stable driving state of a vehicle by controlling a liquid pressure of a brake.

The conventional brake systems are operated in a manner that, when a driver applies a brake pedal, a liquid pressure required for braking is supplied to a wheel cylinder using a mechanically connected booster. However, recently, there has been an increasing use of electronic brake systems including a liquid pressure supply device configured to, when a driver applies a brake pedal, receive a driver's braking intention as an electrical signal from a pedal displacement sensor for sensing a displacement of the brake pedal and supply a wheel cylinder with a liquid pressure required for braking.

RELATED ART DOCUMENT

Patent Document

EP 2 520 473 A1 (Honda Motor Co., Ltd.), 2012 Nov. 7

SUMMARY

Therefore, it is an object of the present invention to provide an electronic brake system capable of reducing the number of components and the weight of a product by integrating a master cylinder and a simulation apparatus into a single unit, and a method of operating the same.

It is another object of the present invention to provide an electronic brake system capable of effectively implementing braking under various operating situations, and a method of operating the same.

It is another object of the present invention to provide an electronic brake system capable of stably generating high-braking pressure, and a method of operating the same.

It is another object of the present invention to provide an electronic brake system having an improved performance and operational reliability, and a method of operating the same.

It is another object of the present invention to provide an electronic brake system capable of improving the durability of a product by reducing a load applied to a component, and a method of operating the same.

It is another object of the present invention to provide an electronic brake system having an improved assembling performance and productivity while reducing the manufacturing cost of a product, and a method of operating the same.

Additional aspects of the invention will be set forth in part in the description which follows and, in part, will be obvious from the description, or may be learned by practice of the invention.

Therefore, it is an aspect of the present invention to provide an electronic brake system including: a reservoir in which a pressurizing medium is stored; an integrated master cylinder including a master chamber, a master piston provided in the master chamber and configured to be displaced by a brake pedal, first and second simulation chambers, a reaction piston provided in the first simulation chamber and configured to be displaced by a liquid pressure of a pressurizing medium accommodated in the master chamber, a damping piston provided in the second simulation chamber and configured to be displaced by the displacement of the reaction piston, and an elastic member provided between the reaction piston and the damping piston; a liquid pressure supply device configured to generate a liquid pressure by operating a hydraulic piston according to an electrical signal being output in response to the displacement of the brake pedal; and a hydraulic control unit having a first hydraulic circuit for controlling a liquid pressure transferred to two wheel cylinders and a second hydraulic circuit for controlling a liquid pressure transferred to other two wheel cylinders.

The integrated master cylinder may further include: a simulation fluid path configured to communicate the first simulation chamber with the second simulation chamber; and a simulator valve provided on the simulation fluid path and configured to control a flow of a pressurizing medium.

The integrated master cylinder may further include a cylinder body in which the master chamber and the first and second simulation chambers may be formed, wherein the master chamber, the first simulation chamber, and the second simulation chamber may be sequentially arranged from an inlet side of the cylinder body, to which the brake pedal is connected, to an inner end portion of the cylinder body.

The electronic brake system may further include: a first backup fluid path configured to connect the master chamber to the first hydraulic circuit; a second backup fluid path configured to connect the first simulation chamber to the second hydraulic circuit; a first cut-valve provided on the first backup fluid path and configured to control a flow of a pressurizing medium; and a second cut-valve provided on the second backup fluid path and configured to control a flow of a pressurizing medium.

The first hydraulic circuit may include a first inlet valve and a second inlet valve for controlling a liquid pressure supplied to a first wheel cylinder and a liquid pressure supplied to a second wheel cylinder, respectively, and a first outlet valve and a second outlet valve for controlling a liquid pressure discharged from the first wheel cylinder to the reservoir and a liquid pressure discharged from the second wheel cylinder to the reservoir, respectively. The second hydraulic circuit may include a third inlet valve and a fourth inlet valve for controlling a liquid pressure supplied to a third wheel cylinder and a liquid pressure supplied to a fourth wheel cylinder, respectively, and a third outlet valve and a fourth outlet valve for controlling a liquid pressure discharged from the third wheel cylinder to the reservoir and a liquid pressure discharged from the fourth wheel cylinder to the reservoir, respectively. The second backup fluid path may be provided to connect the first simulation chamber to a downstream side of the fourth inlet valve of the second hydraulic circuit.

The electronic brake system may further include a reservoir fluid path configured to communicate the integrated master cylinder with the reservoir, wherein the reservoir fluid path may include a first reservoir fluid path configured to communicate the master chamber with the reservoir and a second reservoir fluid path configured to communicate the first simulation chamber with the reservoir.

The electronic brake system may further include: a reservoir check valve provided on the first reservoir fluid path and allowing only a flow of a pressurizing medium directed from the reservoir to the master chamber; and an inspection valve provided on the second reservoir fluid path and controlling a bidirectional flow of a pressurizing medium.

The second backup fluid path may branch between the inspection valve and the first simulation chamber on the second reservoir fluid path.

The reaction piston and the damping piston each may include a receiving groove recessed for at least one portion of the elastic member to be seated thereon.

The liquid pressure supply device may include: a first pressure chamber provided at one side of the hydraulic piston, which is movably accommodated in a cylinder block, and connected to one or more wheel cylinders; and a second pressure chamber provided at an other side of the hydraulic piston and connected to one or more wheel cylinders.

The hydraulic control unit may include: a plurality of hydraulic fluid paths for hydraulically connecting the first pressure chamber and the second pressure chamber to the first hydraulic circuit and the second hydraulic circuit; and at least one valve provided on the plurality of hydraulic fluid paths and configured to control a flow of a pressurizing medium.

The electronic brake system may further include: a pedal displacement sensor configured to sense the displacement of the brake pedal; and an electronic control unit (ECU) configured to control an operation of the valve on the basis of liquid pressure information and displacement information of the brake pedal.

The integrated master cylinder may further include a reaction spring configured to elastically support the damping piston.

It is another aspect of the present invention to provide a method of operating the electronic brake system recited in claim 7, the method including, in a normal operation mode: closing the first cut-valve to seal the master chamber; closing the simulator valve to seal the second simulation chamber, and closing the second cut-valve while opening the inspection valve to communicate the first simulation chamber with the reservoir so that the elastic member is compressed by the reaction piston according to an operation of the brake pedal and an elastic restoring force of the elastic member is provided to a driver as a pedal feel.

It is another aspect of the present invention to provide a method of operating the electronic brake system recited in claim 7, the method including, in an abnormal operation mode: opening the first-cut-valve to communicate the master chamber with the first hydraulic circuit, and closing the inspection valve while opening the simulator valve and the second cut-valve to communicate the first simulation chamber and the second simulation chamber with the second hydraulic circuit; and providing a pressurizing medium of the master chamber to the first hydraulic circuit through the first backup fluid path according to a stepping force of the brake pedal, providing a pressurizing medium of the first simulation chamber to the second hydraulic circuit through the second backup fluid path, and providing a pressurizing medium of the second simulation chamber to the second hydraulic circuit by sequentially passing through the simulation fluid path and the second backup fluid path.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments of the present invention will be described in detail with reference to the accompanying drawings. The following embodiments are provided to fully convey the spirit of the present invention to a person having ordinary skill in the art to which the present invention belongs. The present invention is not limited to the embodiments shown herein but may be embodied in other forms. In order to make the description of the present invention clear, unrelated parts are not shown and, the sizes of components are exaggerated for clarity.

Figure 1:
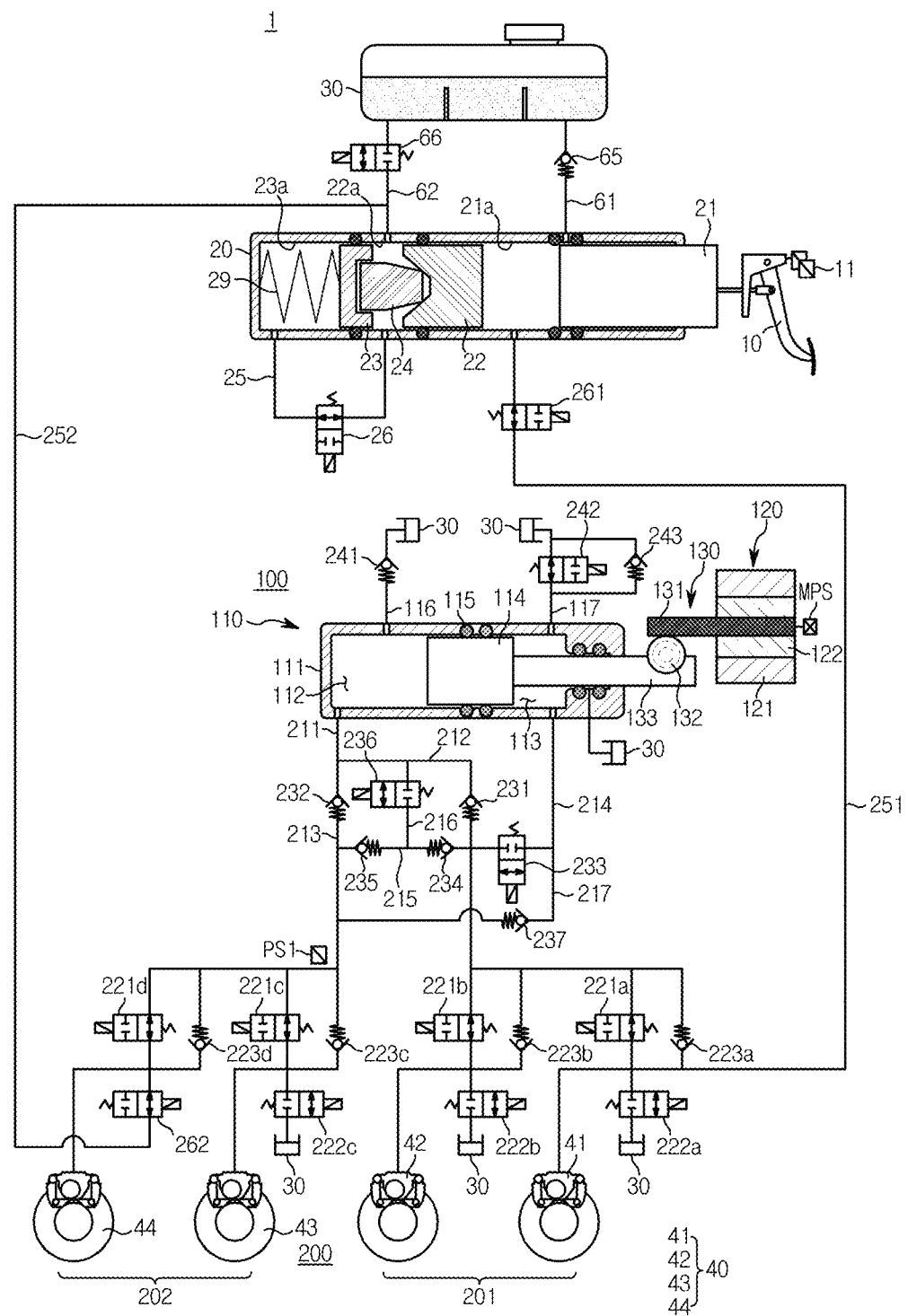
FIG. 1 is a hydraulic circuit diagram illustrating an electronic brake system according to an embodiment of the present invention.

FIG. 1 is a hydraulic circuit diagram illustrating an electronic brake system 1 according to an embodiment of the present invention.

Referring to FIG. 1, the electronic brake system 1 according to the embodiment of the present invention includes an integrated master cylinder 20 configured to pressurize and discharge a pressurizing medium accommodated inside therein, such as a brake oil, by a stepping force of a brake pedal 10 and provide a driver with a reaction force corresponding to the stepping force of the brake pedal 10, a reservoir 30 communicating with the integrated master cylinder 20 and storing a pressurizing medium therein, a wheel cylinder 40 to which a liquid pressure of a pressurizing medium is supplied to perform braking on each vehicle wheel RR, RL, FR, and FL, a liquid pressure supply device 100 configured to receive a driver's braking intention from a pedal displacement sensor 11 for sensing a displacement of the brake pedal 10 as an electrical signal and perform a mechanical operation according to the electrical signal to generate a liquid pressure of a pressurizing medium, a hydraulic control unit 200 configured to control a liquid pressure transferred to the wheel cylinder 40, and an electronic control unit (ECU) (not shown) configured to control the liquid pressure supply device 100 and various valves on the basis of liquid pressure information and pedal displacement information.

The integrated master cylinder 20 includes a master chamber 21a and simulation chambers 22a and 23a to pressurize and discharge a pressurizing medium provided therein while providing a driver with a reaction force against a stepping force of the brake pedal 10.

Figure 2:
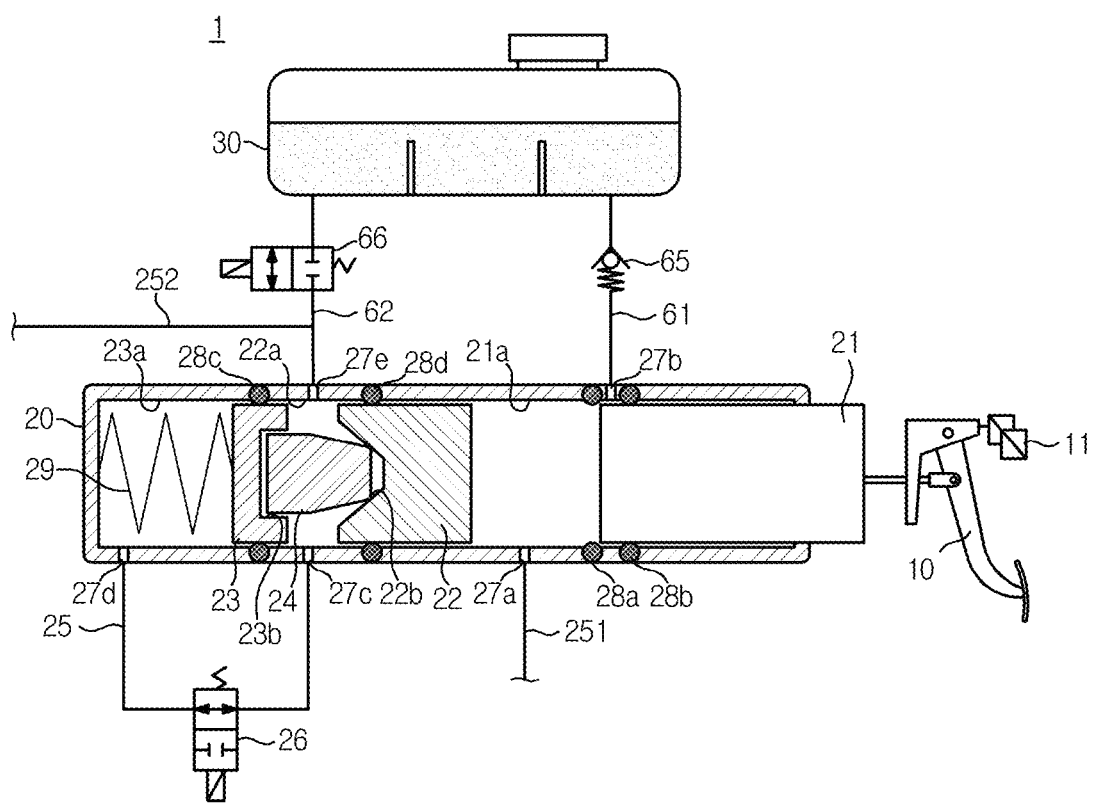
FIG. 2 is an enlarged view illustrating an integrated master cylinder, a reservoir, and a reservoir fluid path of an electronic brake system according to an embodiment of the present invention.

FIG. 2 is an enlarged view illustrating the integrated master cylinder 20, the reservoir 30, and reservoir fluid paths 61 and 62 of the electronic brake system 1 according to an embodiment of the present invention. Referring to FIG. 2, the integrated master cylinder 20 may be divided into a master cylinder part connected to a first hydraulic circuit 201, which will be described below, and a pedal simulation part providing a user with a pedal feel. The integrated master cylinder 20 has the master cylinder part and the pedal simulation part sequentially arranged from a side of the brake pedal 20 to an inner end portion thereof and coaxially arranged in a single cylinder body.

In detail, the integrated master cylinder 20 may include the cylinder body that forms a main body thereof and has chambers 21a, 22a, and 23a formed inside thereof, the master chamber 21a, a master piston 21 provided in the master chamber 21a and configured to be displaced by an operation of the brake pedal 10, a restoration spring (not shown) elastically supporting the master piston 21, the first and second simulation chambers 22a and 23a, a reaction piston 22 provided in the first simulation chamber 22a and displaced by a liquid pressure of a pressurizing medium accommodated in the master chamber 21a, a damping piston 23 provided in the second simulation chamber 23a and displaced by a displacement of the reaction piston 22, an elastic member 24 disposed between the reaction piston 22 and the damping piston 23 to elastically support the pistons 22 and 23, a reaction spring 29 provided in the second simulation chamber 23a and elastically supporting the reaction piston 22 and the damping piston 23, a simulation fluid path 25 communicating the first simulation chamber 22a with the second simulation chamber 23a, and a simulator valve 26 provided on the simulation fluid path 25.

The master chamber 21a is provided with the master piston 21 connected to an input rod, the first simulation chamber 22a is provided with the reaction piston 22, and the second simulation chamber 23a is provided with the damping piston 23 and the reaction spring 29. The master chamber 21a, the first simulation chamber 22a, and the second simulation chamber 23a are sequentially formed on the cylinder body of the integrated master cylinder 20 in a direction from an inlet side of the cylinder body connected with the brake pedal 10 toward the inner end portion of the cylinder body.

The master chamber 21a may have a pressurizing medium introduced thereinto and discharged therefrom by a first hydraulic port 27a and a second hydraulic port 27b, and the first simulation chamber 22a may have a pressurizing medium introduced thereinto and discharged therefrom by a third hydraulic port 27c and a fourth hydraulic port 27d. In addition, the second simulation chamber 23a may have a pressurizing medium introduced thereinto and discharged therefrom by a fifth hydraulic port 27e. In detail, the first hydraulic port 27a may be connected to a first backup fluid path 251 (which will be described below), and the second hydraulic port 27b may be connected to a first reservoir fluid path 61 (which will be described below). In addition, the third and fourth hydraulic ports 27c and 27d may be connected to the simulation fluid path 25, and the fifth hydraulic port 27e may be connected to a second backup fluid path 252 and a second reservoir fluid path 62 (which will be described below).

Meanwhile, the integrated master cylinder 20 according to the embodiment of the present invention includes the master chamber 21a and the first simulation chamber 22a, so that the safety is ensured in the event of malfunction of components thereof. For example, the master chamber 21a may be connected to two wheels of a right front wheel FR, a left front wheel FL, a left rear wheel RL and a right rear wheel RR of the vehicle, and the first simulation chamber 22a may be connected to the remaining two wheels. Accordingly, braking of the vehicle may be performed even in a malfunction of the master chamber 21a for any one of the wheels. For example, the master chamber 21a may be connected to the first and second wheel cylinders 41 and 42, and the first simulation chamber 22a may be connected to the third and fourth wheel cylinders 43 and 44.

The master piston 21 of the integrated master cylinder 20 may be elastically supported by a restoring spring (not shown). Accordingly, when the driver operates the brake pedal 10 so that the brake pedal 10 is displaced, the master piston 21 is moved and the restoring spring is compressed. Thereafter, when the stepping force of the brake pedal 10 is released, the restoring spring is expanded by the elastic force, causing the master piston 21 to return to the original position The master chamber 21a may be connected to the reservoir 30 through the first reservoir fluid path 61, and the first simulation chamber 22a may be connected to the reservoir 30 through the second reservoir fluid path 62. The first reservoir fluid path 61 may be provided with a reservoir check valve 65 that allows only the flow of a pressurizing medium directed from the reservoir 30 to the master chamber 21a while blocking the flow of a pressurizing medium in the opposite direction. In addition, the second reservoir fluid path 62 may be provided with an inspection valve 66 provided as a bidirectional valve for controlling the flow of a pressurizing medium transferred through the second reservoir fluid path 62, and the inspection valve 66 may be provided as a normally-closed type solenoid valve that is closed at normal times and is opened upon receiving an electrical signal from the ECU. The second backup fluid path 252 may branch from a front end of the inspection valve 66 on the second reservoir fluid path 62, and details thereof will be described below.

The integrated master cylinder 20 may include two sealing members 28a and 28b disposed on the front and rear sides of the first reservoir fluid path 61 connected to the master chamber 21a and two sealing members 28c and 28d disposed on the front and rear sides of the second reservoir fluid path 62. The sealing members 28a, 28b, 28c, and 28d may be provided in a ring-shaped structure protruding from the inner wall of the integrated master cylinder 20 or the outer peripheral surface of the master piston 21, the reaction piston 22, and the damping piston 23.

The reaction piston 22 is provided to have a certain range of displacement in the first simulation chamber 22a by the liquid pressure of the pressurizing medium pressurized in the master chamber 21a, and the damping piston 23 is provided to move along with the movement of the reaction piston 22 to pressurize the pressurizing medium accommodated in the second simulation chamber 23a. The damping piston 23 is provided to pressurize the second simulation chamber 23a, and the elastic member 24 is disposed between the reaction piston 22 and the damping piston 23 and is formed of material compressed and expanded according to the displacement of the reaction piston 22 and the damping piston 23, for example, rubber material. In addition, the reaction spring 29 is provided between the rear side of the damping piston 23 (the left side of the damping piston 23 in the drawing) and the inner end portion of the cylinder body of the integrated master cylinder 20 such that the damping piston 23 and the 22 are elastically supported.

The reaction piston 22 is provided at one surface thereof facing the elastic member 24 (the left side in FIG. 1) with an accommodation groove 22b which is recessed for at least a part of the elastic member 24 to be seated thereon for stable compression and restoration of the elastic member 24. Similarly, the damping piston 23 is provided at one surface thereof facing the elastic member 24 (the right side in FIG. 1) with an accommodation groove 22c which is recessed for at least a part of the elastic member 24 to be seated thereon.

The simulation fluid path 25 is provided to communicate the first simulation chamber 22a with the second simulation chamber 23a, and the simulation fluid path 25 is provided with a simulator valve 26 for controlling the flow of a pressurizing medium. The simulator valve 26 may be provided as a normally open type solenoid valve that is open at normal times and is closed upon receiving an electrical signal from the ECU.

Hereinafter, the operation of the pedal simulation by the integrated master cylinder 20 will be described in more detail. When the driver applies a stepping force by operating the brake pedal 10 during normal operation, a first cut-valve 261 and a second cut-valve 262, which will be described below, are closed and the simulator valve 26 of the simulation fluid path 25 is also closed, and the inspection valve 66 of the second reservoir fluid path 62 is opened. The second simulation chamber 23a is sealed due to the simulator valve 26 being closed, and the displacement of the brake pedal 10 allows the master piston 21 to be moved so that the pressurizing medium in the master chamber 21a is pressurized and the corresponding liquid pressure is transferred to a front side surface of the reaction piston 22 (the right side surface of the reaction piston in the drawing) generating a displacement in the reaction piston 22. Since the second simulation chamber 23a is closed, no displacement occurs in the damping piston 23, so that the displacement of the reaction piston 22 allows the elastic member 24 to be compressed, and the elastic restoring force according to the compression of the elastic member 24 provides the driver with a pedal feel. In this case, the pressurizing medium accommodated in the first simulation chamber 22a is transferred to the reservoir 30 through the second reservoir fluid path 62. Thereafter, when the driver releases his/her stepping force from the brake pedal 10, the restoring spring (not shown) and the elastic member 24 expand due to the elastic restoring force, thus returning the reaction piston 22 and the master piston 21 to the original positions thereof, and allowing the first simulation chamber 22a to be filled with a pressurizing medium through the second reservoir fluid path 62.

As such, since the inside of the first simulation chamber 22a is always filled with the pressurizing medium, the friction of the reaction piston 22 and the damping piston 23 is minimized during the pedal simulation operation so that the durability of the integrated master cylinder 20 is improved while preventing foreign substance from being introduced from outside.

Meanwhile, the operating state of the integrated master cylinder 20 during abnormal operation of the electronic brake system 1, that is, in a fallback mode operation, will be described below with reference to FIG. 4.

The reaction spring 29 shown in the drawings is merely an example that may provide an elastic force to the reaction piston 22 and the damping piston 23, and may have various structures capable of storing an elastic force. For example, the reaction spring 29 may be formed of a material, such as rubber, or may be formed of various members capable of storing an elastic force by having a coil or a plate shape.

Meanwhile, a plurality of the reservoirs 30 are shown in the drawing, and are denoted by the same reference numerals. The reservoirs 30 may be provided using the same component or using different components.

The liquid pressure supply device 100 is provided to receive the driver's braking intention from the pedal displacement sensor 11 for sensing a displacement of the brake pedal 10 as an electrical signal and perform a mechanical operation according to the electrical signal to generate a liquid pressure of a pressurizing medium.

The liquid pressure supply apparatus 100 includes a liquid pressure providing unit 110 for providing a pressurizing medium pressure to be transferred to a wheel cylinder, a motor 120 for generating a rotational force according to an electrical signal of the pedal displacement sensor 11, and a power converter 130 for converting the rotational motion of the motor 120 into a linear motion and transferring the linear motion to the liquid pressure providing unit 110. The liquid pressure providing unit 110 may be operated not by a driving force supplied from the motor 120 but by a pressure provided by a high pressure accumulator.

The liquid pressure providing unit 110 includes a cylinder block 111 provided with a pressure chamber that receives and stores a pressurization medium, a hydraulic piston 114 accommodated in the cylinder block 111, sealing members 115a and 115b provided between the hydraulic piston 114 and the cylinder block 111 to seal the pressure chamber, and a drive shaft 133 for transferring the power output from the power converter 130 to the hydraulic piston 114.

The pressure chamber may include a first pressure chamber 112 positioned at a front side of the hydraulic piston 114 (forward direction, leftward direction of the hydraulic piston 114 in the drawing) and a second pressure chamber 113 positioned at a rear side of the hydraulic piston 114 (rearward direction, rightward direction of the hydraulic piston 114 in the drawing). That is, the first pressure chamber 112 is partitioned by the cylinder block 111 and a front end of the hydraulic piston 114 so that the volume of the first pressure chamber 122 is changed according to the movement of the hydraulic piston 114, and the second pressure chamber 113 is partitioned by the cylinder block 111 and a rear end of the hydraulic piston 114 so that the volume of the second pressure chamber 122 is changed according to the movement of the hydraulic piston 114.

The first pressure chamber 112 is connected to a first hydraulic fluid path 211, which will be described below, through a first communication hole 111a formed in the cylinder block 111, and the second pressure chamber 113 is connected to a fourth hydraulic fluid path 214, which will be described below, through a second communication hole 111b formed in the cylinder block 111.

The sealing member 115 includes a piston sealing member 115a provided between the hydraulic piston 114 and the cylinder block 111 to seal between the first pressure chamber 112 and the second pressure chamber 113, and a drive shaft sealing member 115b provided between the drive shaft 133 and the cylinder block 111 to seal openings of the second pressure chamber 113 and the cylinder block 111. The liquid pressure or the negative pressure of the first and second pressure chambers 112 and 113 generated by the forward or backward movement of the hydraulic piston 114 is sealed by the piston sealing member 115a and thus is transferred to the first and fourth hydraulic fluid paths 211 and 214 without leakage, and the liquid pressure or negative pressure of the second pressure chamber 113 generated by the forward or backward movement of the hydraulic piston 114 is sealed by the drive shaft sealing member 115b and thus is prevented from leaking to the outside of the cylinder block 111.

The first and second pressure chambers 112 and 113 may be connected to the reservoir 30 by a first dump fluid path 116 and a second dump fluid path 117, respectively, such that a pressurizing medium, received from the reservoir 30 through the first or second dump fluid path 116 or 117, is stored by the first or second pressure chamber 112 or 113, or a pressurizing medium of the first or second pressure chamber 112 or 113 is transferred to the reservoir 30 through the first or second dump fluid path 116 or 117. To this end, the first dump fluid path 116 may communicate with the first pressure chamber 112 by a third communication hole 111c formed in the cylinder block 111 to thereby being connected to the reservoir 30, and the second dump fluid path 117 may communicate with the second pressure chamber 113 by a fourth communication hole 111d formed in the cylinder block 111 to thereby being connected to the reservoir 30.

The motor 120 is provided to generate a driving force according to an electrical signal output from the ECU. The motor 120 may include a stator 121 and a rotor 122 so that the motor 120 may be rotated in a forward or backward direction to provide power to generate a displacement of the hydraulic piston 114. The rotational angular velocity and the rotational angle of the motor 120 may be precisely controlled by a motor control sensor (MPS). Since the motor 120 is a well-known technique, detailed description thereof will be omitted.

The power converter 130 is provided to convert the rotational force of the motor 120 into a linear motion. The power converter 130 may include a worm shaft 131, a worm wheel 132, and a drive shaft 133.

The worm shaft 131 may be integrally formed with the rotation shaft of the motor 120, and may be provided with a worm on the outer circumferential surface thereof to rotate the worm wheel 132 by being engaged with the worm wheel 132. The worm wheel 132 is engaged with the drive shaft 133 to linearly move the drive shaft 133, and the drive shaft 133 is connected to the hydraulic piston 114 so that the hydraulic piston 114 is slidably moved inside the cylinder block 111.

As described above, when a displacement of the brake pedal 10 is sensed by the pedal displacement sensor 11, the sensed signal is transferred to the ECU, and the ECU drives the motor 120 to rotate the worm shaft 131 in one direction. The rotational force of the warm shaft 131 is transferred to the drive shaft 133 via the worm wheel 132, and the hydraulic piston 114 connected to the drive shaft 133 moves forward in the cylinder block 111, generating a liquid pressure in the first pressure chamber 112.

Conversely, when the stepping force of the brake pedal 10 is released, the ECU drives the motor 120 to rotate the worm shaft 131 in the opposite direction. Accordingly, the worm wheel 132 also rotates in the direction opposite, and the hydraulic piston 114 connected to the drive shaft 133 moves backward in the cylinder block 111, generating a negative pressure in the first pressure chamber 112.

Generation of a liquid pressure and a negative pressure of the second pressure chamber 113 may be implementation by an opposite way to the above. That is, when a displacement of the brake pedal 10 is sensed by the pedal displacement sensor 11, the sensed signal is transferred to the ECU, and the ECU drives the motor 120 to drive the worm shaft 131 in the opposite direction. The rotational force of the warm shaft 131 is transferred to the drive shaft 133 via the worm wheel 132, and the hydraulic piston 114 connected to the drive shaft 133 moves backward in the cylinder block 111, generating a liquid pressure in the second pressure chamber 113.

Conversely, when the stepping force of the brake pedal 10 is released, the ECU drives the motor 120 to rotate the worm shaft 131 in the one direction. Accordingly, the worm wheel 132 also rotates in the one direction, and the hydraulic piston 114 connected to the drive shaft 133 move forward in the cylinder block 111, generating a negative pressure in the second pressure chamber 113.

As such, the liquid pressure supply device 100 may generate a liquid pressure or negative pressure in the first pressure chamber 112 and the second pressure chamber 113 according to the rotation direction of the worm shaft 131 driven by the motor 120, and whether to implement braking by transmitting a liquid pressure or whether to release braking by using a negative pressure may be determined by controlling valves. Details thereof will be described below.

Meanwhile, although not shown in the drawings, the power converter 130 may be provided using a ball screw nut assembly. For example, the power converter 130 may include: a screw integrally formed with the rotating shaft of the motor 120 or connected to rotate together with the rotating shaft of the motor 120; and a ball nut screwed to the screw in a state of being restricted in rotation and configured to linearly move according to the rotation of the screw. Such a structure of the ball screw nut assembly is a generally known technique, so the detailed description thereof will be omitted. In addition, the power converter 130 according to the embodiment of the present invention may be implemented in various structures and methods as long as it can convert a rotational motion into a linear motion.

The hydraulic control unit 200 may include a plurality of hydraulic fluid paths and valves for controlling the liquid pressure and flow of the pressurizing medium delivered to the wheel cylinders 40. The ECU is provided to control the liquid pressure supply device 100 and the various valves on the basis of liquid pressure information and pedal displacement information.

The hydraulic control unit 200 may include the first hydraulic circuit 201 for controlling the flow of a liquid pressure transferred to the first and second wheel cylinders 41 and 42 and the second hydraulic circuit 202 for controlling the flow of a liquid pressure transferred to the third and fourth wheel cylinders 43 and 44, and may include a plurality of fluid paths and valves for controlling a liquid pressure transferred from the integrated master cylinder 20 and the liquid pressure supply device 100 to the wheel cylinders 40.

Hereinafter, referring again to FIG. 1, the hydraulic control unit 200 will be described. However, the description of the hydraulic control unit 200 is merely exemplified to aid in the understanding of the present invention and is not intended to limit the arrangement of the hydraulic fluid path and valve.

Referring to FIG. 1, a first hydraulic fluid path 211 is provided to connect the first pressure chamber 112 to the first and second hydraulic circuits 201 and 202, while branching into a second hydraulic fluid path 212 communicating with the first hydraulic circuit 201 and a third hydraulic fluid path 213 communicating with the second hydraulic circuit 202. Accordingly, a liquid pressure generated in the first pressure chamber 112 by the forward movement of the hydraulic piston 114 may be transferred to the first hydraulic circuit 201 and the second hydraulic circuit 202 through the second hydraulic fluid path 212 and the third hydraulic fluid path 213, respectively.

The second hydraulic fluid path 212 may be provided with a first valve 231 for controlling the flow of a pressurizing medium, and the first valve 231 may be provided as a check valve that allows only a flow of a pressurizing medium in a direction from the first pressure chamber 112 to the first hydraulic circuit 201 while blocking a flow of a pressurizing medium in the opposite direction. That is, the first valve 231 allows a liquid pressure generated in the first pressure chamber 112 to be transferred to the first hydraulic circuit 201 while preventing a liquid pressure of the first hydraulic circuit 201 from leaking to the first pressure chamber 112 through the second hydraulic fluid path 212.

The third hydraulic fluid path 213 may be provided with a second valve 232 for controlling the flow of a pressurizing medium, and the second valve 232 may be provided as a check valve that allows only a flow of a pressurizing medium in a direction from the first pressure chamber 112 to the second hydraulic circuit 202 while blocking a flow of a pressurizing medium in the opposite direction. That is, the second valve 231 allows a liquid pressure generated in the first pressure chamber 112 to be transferred to the second hydraulic circuit 202 while preventing a liquid pressure of the second hydraulic circuit 202 from leaking to the first pressure chamber 112 through the third hydraulic fluid path 213.

A fourth hydraulic fluid path 214 may be provided to connect the second pressure chamber 113 to the first hydraulic circuit 201, and a fifth hydraulic fluid path 215 may have one end connected to a rear end of the first valve 231 on the second hydraulic fluid path 212 and the other end connected to a rear end of the second valve 232 of the third hydraulic fluid path 213 to connect the second hydraulic fluid path 212 and the third hydraulic fluid path 213 to each other. A sixth hydraulic fluid path 216 may be provided to connect the second hydraulic fluid path 212 to the fifth hydraulic fluid path 215, and to this end, both ends of the sixth hydraulic fluid path 216 communicate with a front end of the first valve 231 on the second hydraulic fluid path 212 and the fifth hydraulic fluid path 215. In addition, a seventh hydraulic fluid path 217 branches from a front end of a third valve 233 on the fourth hydraulic fluid path 214 to connect the second pressure chamber 113 to the second hydraulic circuit 202, and joins the rear end of the second valve 232 on the third hydraulic fluid path 213.

The third valve 233 is provided on the fourth hydraulic fluid path 214 to control the flow of a pressurizing medium.

The third valve 233 may be provided as a bidirectional valve for controlling the flow of a pressurizing medium transferred along the fourth hydraulic fluid path 214 communicating with the second pressure chamber 113. A fourth valve 234 may be provided as a normally closed type solenoid valve that is closed at normal times and is opened upon receiving an electrical signal from the ECU.

The fifth hydraulic fluid path 215 may be provided with fourth and fifth valves 234 and 235 for controlling the flow of a pressurizing medium.

The fourth valve 234 may be provided between a point on the fifth hydraulic fluid path 215 connected with the sixth hydraulic fluid path 216 and a point on the fifth hydraulic fluid path 215 connected with the second hydraulic flow path 212. The fifth valve 235 may be provided between a point on the fifth hydraulic fluid path 215 connected with the sixth hydraulic fluid path 216 and a point on the fifth hydraulic fluid path 215 connected with the third hydraulic fluid path 213. The fourth valve 234 may be provided as a check valve that allows only the flow of a pressurizing medium in a direction from the second hydraulic fluid path 212 to the point where the sixth hydraulic fluid path 216 is connected, and the fifth valve 234 may be provided as a check valve that allows only the flow of a pressurizing medium in a direction from the third hydraulic flow path 213 to the point where the sixth hydraulic fluid path 216 is connected.

The sixth hydraulic flow path 216 may be provided with a sixth valve 236 for controlling the flow of a pressurizing medium.

The sixth valve 236 may be provided as a bidirectional valve for controlling the flow of a pressurizing medium transferred along the sixth hydraulic fluid path 216. The sixth valve 236 may be provided as a normally closed type solenoid valve that is closed at normal times and is opened upon receiving an electrical signal from the ECU.

The seventh hydraulic fluid path 217 may be provided with a seventh valve 237 for controlling the flow of the pressurizing medium.

The seventh valve 237 may be provided as a check valve that allows only the flow of a pressurizing medium in a direction from the second pressure chamber 113 to the second hydraulic circuit 202 while blocking the flow of a pressurizing medium in the opposite direction. That is, the seventh valve 237 allows a liquid pressure generated in the second pressure chamber 113 to be transferred to the second hydraulic circuit 202 while preventing a liquid pressure of the second hydraulic circuit 202 from leaking to the second pressure chamber 113 through the seventh hydraulic fluid path 217.

Hereinafter, the first hydraulic circuit 201 and the second hydraulic circuit 202 of the hydraulic control unit 200 will be described.

The first hydraulic circuit 201 controls the liquid pressures of the first and second wheel cylinders 41 and 42, which are two of the four wheels RR, RL, FR and FL, and the second hydraulic circuit 202 controls the liquid pressures of the third and fourth wheel cylinders 43 and 44 which are the other two wheel cylinders.

The first hydraulic circuit 201 is connected to the first hydraulic fluid path 211 and the second hydraulic fluid path 212 to receive a liquid pressure from the liquid pressure supply device 100, and the second hydraulic fluid path 212 branches into two fluid paths connecting to the first wheel cylinder 41 and the second wheel cylinder 42. Similarly, the second hydraulic circuit 202 is connected to the first hydraulic fluid path 211 and the third hydraulic fluid path 213 to receive the liquid pressure from the liquid pressure supply device 100, and the third hydraulic fluid path 213 branches into two fluid paths connecting to the third wheel cylinder 43 and the fourth wheel cylinder 44.

The first and second hydraulic circuits 201 and 202 are provided with first to fourth inlet valves 221 (221: 221a, 221*b*, 221*c*, and 221*d*) to control the flow and liquid pressure of pressurizing media transferred to the first to fourth wheel cylinders 40, respectively. The first to fourth inlet valves 221 are disposed on the upstream sides of the first to fourth wheel cylinders 40, respectively, and may be provided as a normally open type solenoid valve that is open at normal times and is closed upon receiving an electrical signal from the ECU.

The first and second hydraulic circuits 201 and 202 may include first to fourth check valves 223*a*, 223*b*, 223*c*, and 223*d* provided in parallel to the first to fourth inlet valves 221*a*, 221*b*, 221*c* and 221*d*. The check valves 223*a*, 223*b*, 223*c* and 223*d* may be provided on bypass fluid paths each connecting a front side to a rear side of a corresponding one of the first to fourth inlet valves 221*a*, 221*b*, 221*c*, and 221*d* on the first and second hydraulic circuits 201 and 202, and may be provided to block the flow of a pressurizing medium from the liquid pressure providing unit 110 to the wheel cylinder while only allowing the flow of a pressurizing medium from each wheel cylinder to the liquid pressure providing unit 110. The first to fourth check valves 223*a*, 223*b*, 223*c*, and 223*d* may rapidly extract the liquid pressure of the pressurizing medium applied to the first to fourth wheel cylinders 40, and even when the first to fourth inlet valves 221*a*, 221*b*, 221*c*, and 221*d* are not normally operated, may allow the liquid pressure of the pressurizing medium applied to the wheel cylinders to be introduced into the liquid pressure providing unit 110.

The first hydraulic circuit 201 may include first and second outlet valves 222*a* and 222*b* connected to the reservoir 30 to improve the performance of releasing brake of the first and second wheel cylinders 41 and 42. In addition, the second hydraulic circuit 202 may include a third outlet valve 222*c* connected to the reservoir 30 to improve the performance of releasing brake of the third wheel cylinder 43. The first to third outlet valves 222*a* and 222*b* are connected to the first to third wheel cylinders 41 to 43 to control the flow of the pressurizing medium discharged from the first to third wheel cylinders 41 to 43. That is, the first to third outlet valves 222*a* to 222*c* may sense the braking pressure of the first to third wheel cylinders 41 to 43 and when the decompression braking is required, are selectively opened to control the depressurization of the wheel cylinder. The first to third outlet valves 222*a* to 222*c* may be provided as a normally closed type solenoid valve that is closed at normal times and is opened upon receiving an electrical signal from the ECU.

Meanwhile, the second backup fluid path 252, which will be described below, joins a rear end or a downstream side of the fourth inlet valve 221*d* at a side of the fourth wheel cylinder 44, and the second backup fluid path 252 is provided with the second cut-valve 262 for controlling the flow of a pressurizing medium. Details thereof will be described below.

The first and second dump fluid paths 116 and 117 are provided with a first dump valve 241 and a second dump valve 242, respectively, for controlling the flow of a pressurizing medium. Referring again to FIG. 1, the first dump valve 241 is provided as a check valve that allows only the flow of a pressurizing medium in a direction from the reservoir 30 to the first pressure chamber 112 while blocking the flow of a pressurizing medium in the opposite direction. That is, the first dump valve 241 allows a pressurizing medium to flow from the reservoir 30 to the first pressure chamber 112 while blocking a pressurizing medium from flowing from the first pressure chamber 112 to the reservoir 30. The second dump valve 242 may be provided as a bidirectional valve that controls the flow of a pressurizing medium between the second pressure chamber 113 and the reservoir 30. The second dump valve 242 may be provided as a normally open type solenoid valve which is open at normal times and is closed upon receiving an electrical signal from the ECU.

In addition, the second dump fluid path 117 may be provided with a bypass fluid path connected in parallel to the second dump valve 242. In detail, the bypass fluid path may be formed by connecting a front side and a rear side of the second dump valve 242 in a roundabout way on the second dump fluid path 117. The bypass fluid path may be provided with a third dump valve 243 for controlling the flow of a pressurizing medium between the second pressure chamber 113 and the reservoir 30. The third dump valve 243 may be provided as a check valve that allows only the flow of a pressurizing medium in a direction from the reservoir 30 to the second pressure chamber 113 while blocking the flow of a pressurizing medium in the opposite direction. That is, the third dump valve 243 allows a pressurizing medium to flow from the reservoir 30 to the second pressure chamber 113 while blocking a pressurizing medium from flowing from the second pressure chamber 113 to the reservoir 30.

The liquid pressure providing unit 110 of the electronic brake system 1 according to the embodiment of the present invention may operate in a double acting manner.

In detail, a liquid pressure generated in the first pressure chamber 112 by a forward movement of the hydraulic piston 114 is transferred to the first hydraulic circuit 201 through the first hydraulic fluid path 211 and the second hydraulic fluid path 212 to implement braking of the first and second wheel cylinders 41 and 42, and is also transferred to the second hydraulic circuit 202 through the first hydraulic fluid path 211 and the third hydraulic fluid path 213 to implement braking of the third and fourth wheel cylinders 43 and 44.

Similarly, a liquid pressure generated in the second pressure chamber 113 by a backward movement of the liquid pressure piston 114 is transferred to the first hydraulic circuit 201 through the fourth hydraulic fluid path 214 and the second hydraulic fluid path 212 to implement braking of the first and second wheel cylinders 41 and 42, and is also transferred to the second hydraulic circuit 202 through the seventh hydraulic fluid path 217 and the third hydraulic flow path 213 to implement braking of the third and fourth wheel cylinders 43 and 44.

In addition, a negative pressure generated in the first pressure chamber 112 by a backward movement of the hydraulic piston 114 suction the pressurizing medium of the first and second wheel cylinders 41 and 42 such that the pressurizing medium is returned from the first hydraulic circuit 201 to the second hydraulic fluid path 212, the fifth hydraulic flow path 215, the sixth hydraulic fluid path 216, and to the first pressure chamber 112, and suctions the pressurizing medium of the third and fourth wheel cylinders 43 and 44 such that the pressurizing medium is returned from the second hydraulic circuit 202 to the third hydraulic fluid path 213, the fifth hydraulic flow path 215, the sixth hydraulic fluid path 216, and to the first pressure chamber 112, Further, the electronic brake system 1 according to the embodiment of the present invention may include the first and second backup fluid paths 251 and 252 that are configured to, when the normal operation is not performed due to a failure of the apparatus or the like, supply a pressurizing medium discharged from the integrated master cylinder 20 directly to the wheel cylinder so that braking is performed. The operation mode in which the liquid pressure of the integrated master cylinder 20 is directly transferred to the wheel cylinder is referred to as a fallback mode.

The first backup fluid path 251 is provided to connect the master chamber 21a of the integrated master cylinder 20 to the first hydraulic circuit 201, and the second backup fluid path 252 is provided to connect the first simulation chamber 22a of the integrated master cylinder 20 to the second hydraulic circuit 202. In detail, the first backup fluid path 251 may be connected to join the rear end of the first or second inlet valve 221a or 221b on the first hydraulic circuit 201, and the second backup fluid path 252 may be connected to join the rear end of the fourth inlet valve 221d on the second hydraulic circuit 202.

The first backup fluid path 251 is provided with the first cut-valve 261 for controlling the flow of a pressurizing medium, and the second backup fluid path 252 is provided with the second cut-valve 262 for controlling the flow of a pressurizing medium. The first and second cut-valves 261 and 262 may be provided as a normally open type solenoid valve that is open at normal times and is closed upon receiving a closing signal from the ECU.

Accordingly, when the first and second cut-valves 261 and 262 are closed, a liquid pressure provided by the liquid pressure supply device 100 may be supplied to the wheel cylinders through the first and second hydraulic circuits 201 and 202, and when the first and second cut-valves 261 and 262 are opened, a liquid pressure provided by the integrated master cylinder 20 may be supplied to the wheel cylinders through the first and second backup fluid paths 251 and 252.

The electronic brake system 1 according to the embodiment of the present invention may include a fluid path pressure sensor PS1 for sensing the liquid pressure of at least one of the first hydraulic circuit 201 and the second hydraulic circuit 202. The fluid path pressure sensor PS1 is provided at the front end of at least one of the inlet valves 221 of the first hydraulic circuit 201 and the second hydraulic circuit 202 to sense the liquid pressure of a pressurizing medium applied to the first hydraulic circuit 201 and the second hydraulic circuit 202. Although the fluid path pressure sensor PS1 is illustrated as being provided in the second hydraulic circuit 202 in the drawing, the liquid pressure sensor PS1 is not limited thereto and may be provided in one or more units thereof as long as it can sense a liquid pressure applied to the hydraulic circuits 201 and 202.

Hereinafter, the operation of the electronic brake system 1 according to the embodiment of the present invention will be described.

Figure 3:
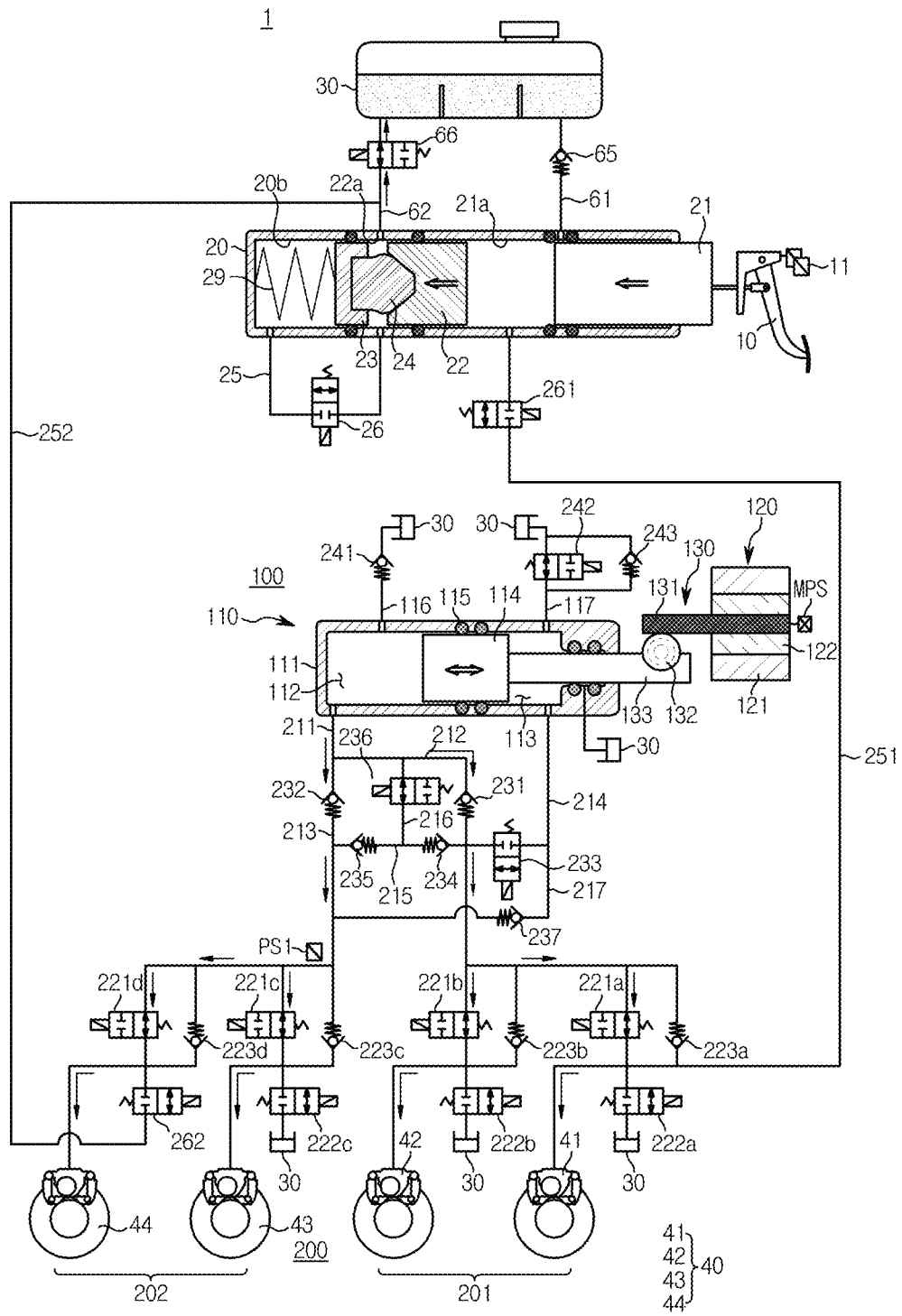
FIG. 3 is a hydraulic circuit diagram illustrating a normal operation mode state of an electronic brake system according to the embodiment of the present invention.
Figure 4:
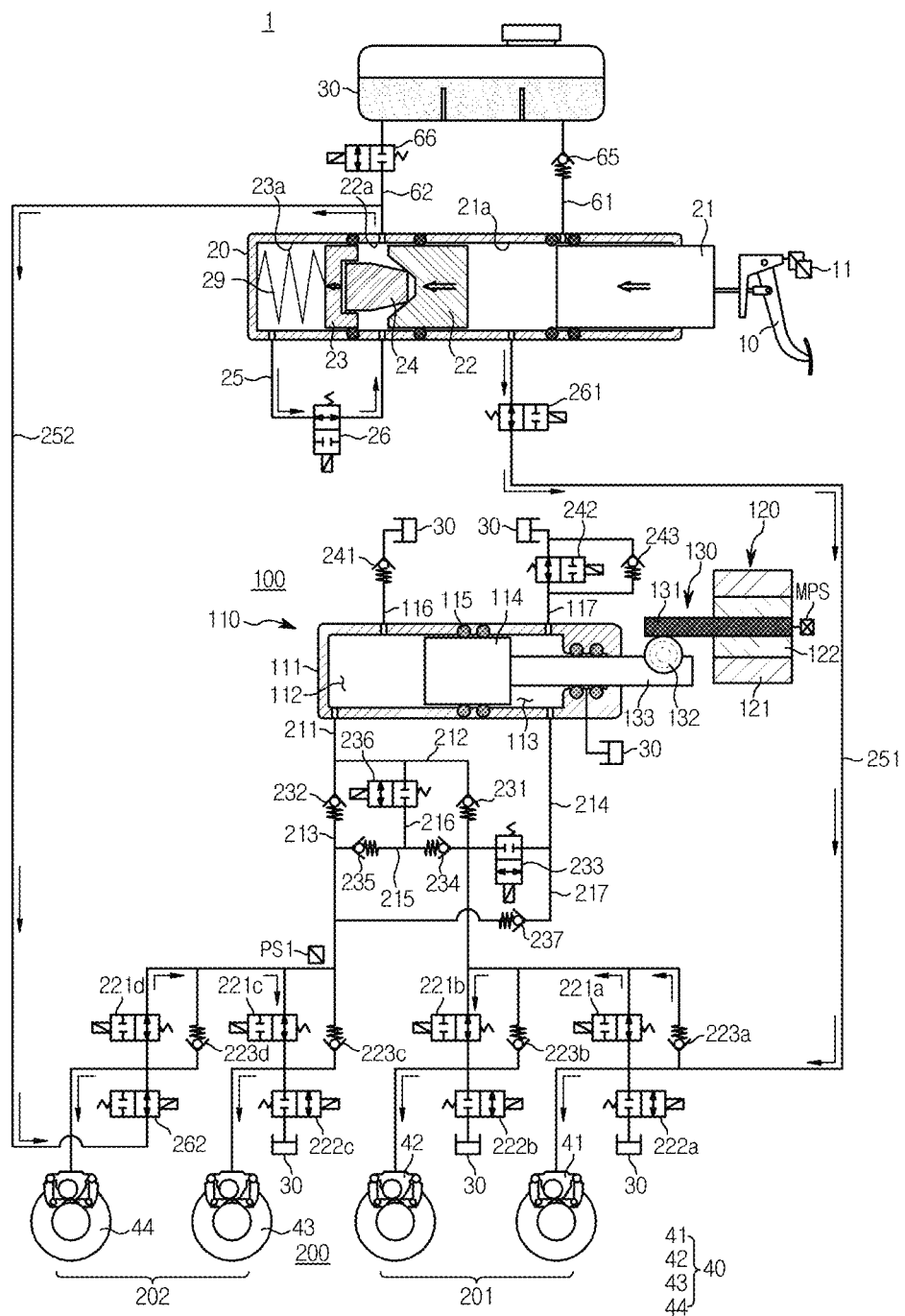
FIG. 4 is a hydraulic circuit diagram illustrating an abnormal operation mode (a fallback mode) state of an electronic brake system according to the embodiment of the present invention.

FIG. 3 is a hydraulic circuit diagram illustrating a state in which a braking pressure is provided in a normal operation mode of the electronic brake system 1 according to the embodiment of the present invention, and FIG. 4 is a hydraulic circuit diagram illustrating a state in which a braking pressure is provided in an abnormal operation mode (a fallback mode) of the electronic brake system 1 according to the embodiment of the present invention.

Referring to FIG. 3, in the normal operation mode of the electronic brake system 1, when the driver applies the brake pedal 10 at an initial stage of braking, the motor 120 operates to rotate in one direction or the other direction, and the rotational force of the motor 120 is transferred to the liquid pressure providing unit 110 by the power converter 130, causing the hydraulic piston 114 of the liquid pressure providing unit 110 to be moved forward or backward to generate a liquid pressure in the first pressure chamber 112 or the second pressure chamber 113. A liquid pressure discharged from the first pressure chamber 112 or the second pressure chamber 113 is provided to the first to fourth wheel cylinders 40 provided at the four wheels through the first hydraulic circuit 201 and the second hydraulic circuit 202 of the hydraulic control unit 200 to thereby generate the braking force.

In the normal operation mode, the braking pressure of the wheel cylinder 40 is provided from the liquid pressure supply device 100 while being adjusted through the hydraulic control unit 200 and transferred to the respective wheel cylinders 40. The first and second cut-valves 261 and 262 provided in the first and second backup fluid paths 251 and 252 are closed to prevent the liquid pressure discharged from the integrated master cylinder 20 from being transferred to the wheel cylinder while preventing the liquid pressure of the pressurizing medium generated from the liquid pressure supply device 100 from being transferred to the integrated master cylinder 20.

In detail, in the normal operation mode, the first cut-valve 261 provided in the first backup fluid path 251 is closed, and therefore the master chamber 21a of the integrated master cylinder 20 is sealed. Accordingly, a displacement generated in the master piston 21 by the stepping force of the brake pedal 10 pressurizes the pressurizing medium accommodated in the master chamber 21a to form a liquid pressure, and the liquid pressure of the pressurizing medium formed in the master chamber 21a is transferred to the front surface of the reaction piston 22 (the right side in FIG. 3) to generate a displacement in the reaction piston 22. Since, in the normal operation mode, the simulator valve 26 provided on the simulation fluid path 25 is closed, the second simulation chamber 23a is sealed so that no displacement occurs in the damping piston 23, and since the inspection valve 66 provided on the second reservoir fluid path 62 is opened but the second cut-valve 262 is closed so that the first simulation chamber 22a communicates with the reservoir 30. Accordingly, the displacement of the reaction piston 22 compresses the elastic member 24, and an elastic restoring force due to the compression of the elastic member 24 serves as a reaction force corresponding to the driver's stepping force of the brake pedal 10, thereby providing the user with a pedal feel. In this case, the pressurizing medium accommodated in the first simulation chamber 22a is discharged to the reservoir 30 through the second reservoir fluid path 62.

Hereinafter, a case in which the electronic brake system 1 according to the embodiment of the present invention does not normally operate, that is, a fallback mode operation will be described.

The fall back mode is performed when the electronic brake system 1 is not normally operated due to a malfunction and the like, the valves are controlled to operate in a non-operating state, that is, in an initial state of braking. When the driver applies a stepping force to the brake pedal 10, the master piston 21 connected to the brake pedal 10 moves forward and thus comes to have a displacement. Since the first cut-valve 261 is provided to be open in the non-operating state, the forward movement of the master piston 21 allows the pressurizing medium accommodated in the master chamber 21a to be transferred to the first and second wheel cylinders 41 and 42 of the first hydraulic circuit 201 along the first backup fluid path 251, so that braking is implemented.

In addition, the pressurizing medium pressurized in the master chamber 21a moves the reaction piston 22 forward to generate a displacement of the reaction piston 22 so that the pressurizing medium accommodated in the first simulation chamber 22a is transferred to the third and fourth wheel cylinders 43 and 44 of the second hydraulic circuit 202 along the second backup fluid path 252 so that braking is implemented. At the same time, since the simulator valve 26 is provided to be open in the non-operating state, the damping piston 23 is also moved forward together with the forward movement of the reaction piston 22 and thus comes to have a displacement, so that the pressurizing medium accommodated in the second simulation chamber 23a is introduced into the first simulation chamber 22a through the simulation fluid path 25 and is transferred to the third and fourth wheel cylinders 43 and 44 through the second backup fluid path 252 to implement braking. In this case, since the inspection valve 66 is provided to be closed in the non-operating state, the pressurizing medium provided from the first simulation chamber 22a is not discharged to the reservoir 30.

In this case, the first to fourth inlet valves 221 provided in the first and second hydraulic circuits 201 and 202 are controlled to be open, so that the pressurized media in the master chamber 21a of the integrated master cylinder 20 and the first and second simulation chambers 22a and 23a may be immediately transferred to the four wheel cylinders 40, thereby improving braking stability while achieving a rapid braking.

Hereinafter, an electronic brake system 2 according to another embodiment of the present invention will be described.

Figure 5:
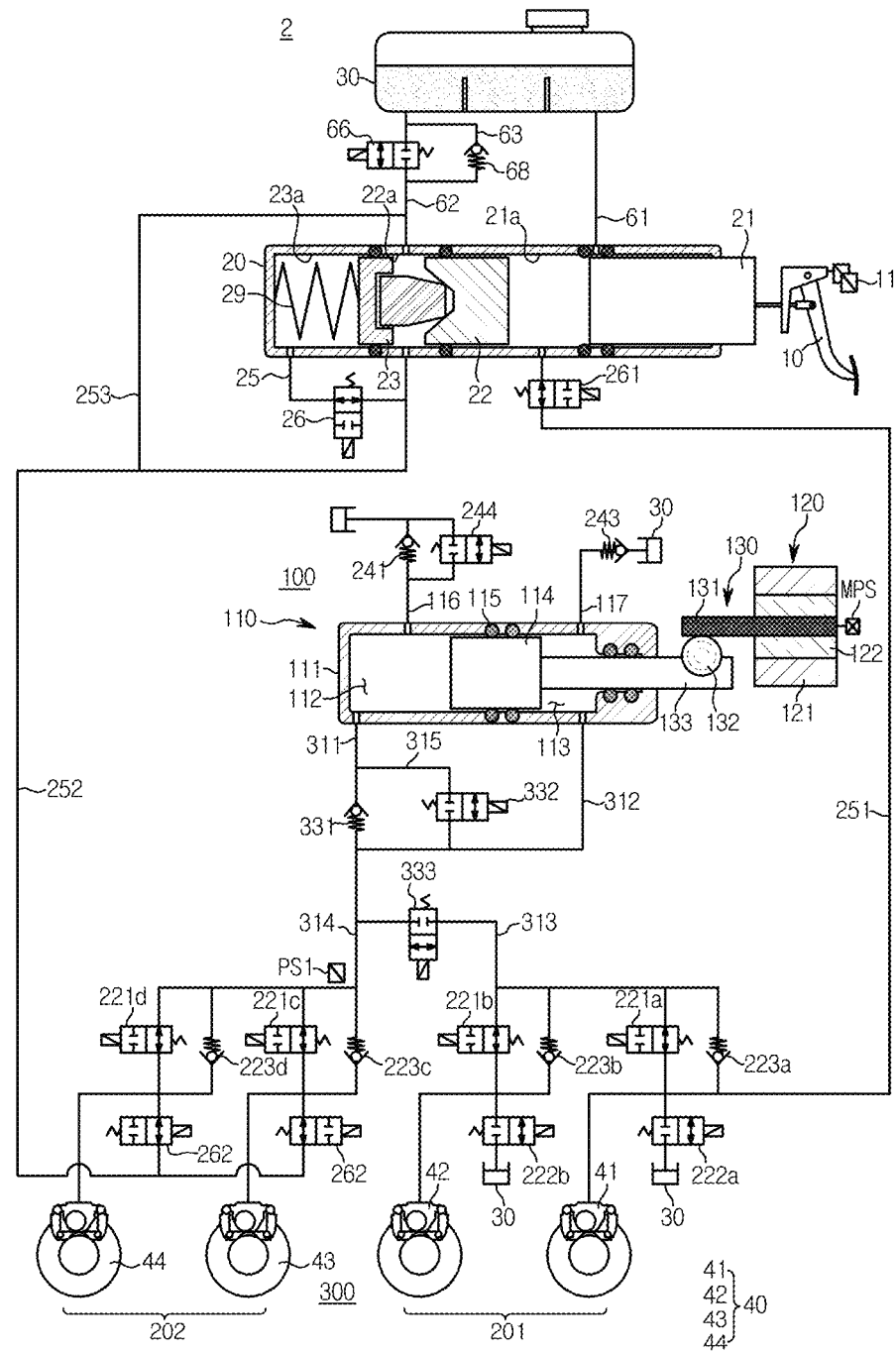
FIG. 5 is a hydraulic circuit diagram illustrating an electronic brake system according to another embodiment of the present invention.

FIG. 5 is a hydraulic circuit diagram illustrating an electronic brake system 2 according to another embodiment of the present invention.

Referring to FIG. 5, the electronic brake system 2 according to the embodiment of the present invention includes an integrated master cylinder 20 configured to pressurize and discharge a brake fluid, such as a brake oil, accommodated inside therein by a stepping force of a brake pedal 10 and to provide a driver with a reaction force corresponding to the stepping force of the brake pedal 10, a reservoir 30 communicating with the integrated master cylinder 20 and storing a pressurizing medium therein, a wheel cylinder 40 to which a liquid pressure of the brake fluid is supplied to perform braking on each vehicle wheel RR, RL, FR, and FL, a liquid pressure supply device 100 configured to receive a driver's braking intention from a pedal displacement sensor 11 for sensing a displacement of the brake pedal 10 as an electrical signal and perform a mechanical operation according to the electrical signal to generate a liquid pressure of a brake fluid, a hydraulic control unit 300 configured to control a liquid pressure transferred to the wheel cylinder 40, and an electronic control unit (ECU) (not shown) configured to control the liquid pressure supply device 100 and various valves on the basis of liquid pressure information and pedal displacement information.

In the following description of the electronic brake system 2 according to the embodiment of the present invention, configurations, which are identical to those of the electronic brake system 1 described in the above embodiment of the present invention, will be omitted in order to avoid redundancy.

A second reservoir fluid path 62 may be provided with an inspection valve 66 provided as a bidirectional valve for controlling the flow of a brake fluid transferred through the second reservoir fluid path 62, and the inspection valve 66 may be provided as a normally closed type solenoid valve that is closed at normal times and is opened upon receiving an electrical signal from the ECU. On the second reservoir fluid path 62, a bypass fluid path 63 is connected in parallel to the inspection valve 66, and the bypass fluid path 63 is provided with a check valve 68 allowing only the flow of a brake fluid in one direction. The check valve 68 may allow the flow of a brake fluid transferred from the reservoir 30 while blocking the flow of a brake fluid directed to the reservoir 30.

An auxiliary backup fluid path 253 may branch from a front end of the inspection valve 66 on the second reservoir fluid path 62. The auxiliary backup fluid path 253 may be connected to a second backup fluid path 252, and details thereof will be described below.

A simulation fluid path 25 is provided to communicate a first simulation chamber 22a with a second simulation chamber 23a and is provided with a simulator valve 26 for controlling the flow of a brake fluid. The simulator valve 26 may be provided as a normally open type solenoid valve that is open at normal times and is closed upon receiving an electrical signal from the ECU.

In addition, a first dump fluid path 116 may be provided with a bypass fluid path connected in parallel to a first dump valve 241. In detail, the bypass fluid path may be formed by connecting a front side and a rear side of the first dump valve 241 in a roundabout way on the first dump fluid path 116. The bypass fluid path may be provided with a fourth dump valve 244 for controlling the flow of a pressurizing medium between a first pressure chamber 112 and the reservoir 30. The fourth dump valve 244 may be provided as a bidirectional valve that controls the flow of a pressurizing medium between the reservoir 30 and the first pressure chamber 112. The fourth dump valve 244 may be provided as a normally closed type solenoid valve that is closed at normal times and is opened upon receiving an electrical signal from the ECU.

The hydraulic control unit 300 may be provided to control the liquid pressure transferred to the wheel cylinder 40, and the ECU may be provided to control the liquid pressure supply device 100 and various valves on the basis of liquid pressure information and pedal displacement information.

Referring to FIG. 5, a first hydraulic fluid path 311 is provided to connect the first pressure chamber 112 to the first and second hydraulic circuits 201 and 202, and a second hydraulic fluid path 312 is provided to connect the second pressure chamber 113 to the first and second hydraulic circuits 201 and 202. The first and second hydraulic fluid paths 311 and 312 may join and then branches into a third hydraulic fluid path 313 communicating with the first hydraulic circuit 201, and a fourth hydraulic fluid path 314 communicating with the second hydraulic circuit 202. Accordingly, the liquid pressure generated in the first pressure chamber 112 by the forward movement of the hydraulic piston 114 may be transferred to the first hydraulic circuit 201 through the first hydraulic fluid path 311 and the third hydraulic fluid path 313, and may be transferred to the second hydraulic circuit 202 through the first hydraulic fluid path 311 and the fourth hydraulic fluid path 314. In addition, the liquid pressure generated in the second pressure chamber 113 by the backward movement of the hydraulic piston 114 may be transferred to the first hydraulic circuit 201 through the second hydraulic fluid path 312 and the third hydraulic fluid path 313, and may be transferred to the second hydraulic circuit 202 through the second hydraulic fluid path 312 and the fourth hydraulic fluid path 314.

The first hydraulic fluid path 311 may be provided with a first control valve 331 for controlling the flow of a brake fluid, and the first control valve 331 may be provided as a check valve that allows only the flow of a pressurizing medium directed from the first pressure chamber 112 to the first and second fluid circuits 201 and 202 while blocking the flow of a pressurizing medium in the opposite direction. That is, the first control valve 331 may allow a liquid pressure generated in the first pressure chamber 112 to be transferred to the first and second hydraulic circuits 201 and 202 while blocking a liquid pressure of the first and second hydraulic circuits 201 and 202 from leaking to the first pressure chamber 112 through the first hydraulic fluid path 312.

A fifth hydraulic fluid path 315 may be provided to connect a front end of the first control valve 331 on the first hydraulic fluid path 311 to the second hydraulic fluid path 312, and may be provided with a second control valve 332 for controlling the flow of a brake fluid. The second control valve 332 may be provided as a bidirectional control valve for controlling the flow of a brake fluid transferred between the first hydraulic flow path 311 and the second hydraulic fluid path 312 along the fifth hydraulic fluid path 315. The second control valve 332 may be provided as a normally closed type solenoid valve that is closed at normal times and is opened upon receiving an electrical signal from the ECU.

A third control valve 333 may be provided at a rear end of a point where the third and fourth hydraulic fluid paths 313 and 414 branch. The third control valve 333 is provided between the third and fourth hydraulic fluid paths 313 and 414 to control the flow of a brake fluid. The third control valve 333 may be provided as a normally closed type solenoid valve that is closed at normal times and is opened upon receiving an electrical signal from the ECU.

A first backup fluid path 251 is provided with a first cut-valve 261 for controlling the flow of a brake fluid, and a second backup fluid path 252 is provided with at least one second cut-valve 262 for controlling the flow of the brake fluid. In addition, the second reservoir fluid path 62 may be provided with an auxiliary backup fluid path 253 that branches therefrom to assist in communication between the first simulation chamber 22a and the second hydraulic circuit 202. The auxiliary backup fluid path 253 may branch from the front end of the inspection valve 66 of the second reservoir fluid path 62 and join the second backup fluid path 252.

As is apparent from the above, the electronic brake system and the method of operating same can reduce the number of components and the weight of a product using an integrated master cylinder.

The electronic brake system and the method of operating same can stably and effectively implement braking under various operating situations.

The electronic brake system and the method of operating same can stably generate high-braking pressure.

The electronic brake system and the method of operating same can improve the performance and operational reliability of a product.

The electronic brake system and the method of operating same can stably provide a braking pressure even at a time of malfunction of a component or leakage of a pressurizing medium.

The electronic brake system and the method of operating same can improve the durability of a product by reducing a load applied to a component.

The electronic brake system and the method of operating same can improve assembling performance and productivity of a product while reducing the manufacturing cost.

What is claimed is:

1. An electronic brake system comprising:
a reservoir in which a pressurizing medium is stored;
an integrated master cylinder including a master chamber, a master piston provided in the master chamber and configured to be displaced by a brake pedal, first and second simulation chambers, a reaction piston provided in the first simulation chamber and configured to be displaced by a liquid pressure of a pressurizing medium accommodated in the master chamber, a damping piston provided in the second simulation chamber and configured to be displaced by displacement of the reaction piston, and an elastic member provided between the reaction piston and the damping piston, wherein the elastic member contacts a surface of the reaction piston so that the elastic member is seated on a surface of the damping piston;
a liquid pressure supply device configured to generate a liquid pressure by operating a hydraulic piston according to an electrical signal being output in response to the displacement of the brake pedal; and
a hydraulic control unit having a first hydraulic circuit for controlling a liquid pressure transferred to two wheel cylinders of a plurality of wheel cylinders and a second hydraulic circuit for controlling a liquid pressure transferred to two other wheel cylinders of the plurality of wheel cylinders.

2. An electronic brake system comprising:
a reservoir in which a pressurizing medium is stored;
an integrated master cylinder including a master chamber, a master piston provided in the master chamber and configured to be displaced by a brake pedal, first and second simulation chambers, a reaction piston provided in the first simulation chamber and configured to be displaced by a liquid pressure of a pressurizing medium accommodated in the master chamber, a damping piston provided in the second simulation chamber and configured to be displaced by displacement of the reaction piston, and an elastic member provided between the reaction piston and the damping piston;
a liquid pressure supply device configured to generate a liquid pressure by operating a hydraulic piston according to an electrical signal being output in response to the displacement of the brake pedal; and
a hydraulic control unit having a first hydraulic circuit for controlling a liquid pressure transferred to two wheel cylinders of a plurality of wheel cylinders and a second hydraulic circuit for controlling a liquid pressure transferred to two other wheel cylinders of the plurality of wheel cylinders,
wherein the integrated master cylinder further comprises:
a simulation fluid path configured to communicate the first simulation chamber with the second simulation chamber; and
a simulator valve provided on the simulation fluid path and configured to control a flow of pressurizing medium through the simulation fluid path.

3. The electronic brake system of claim 1, wherein the integrated master cylinder further comprises a cylinder body in which the master chamber and the first and second simulation chambers are formed,
wherein the master chamber, the first simulation chamber, and the second simulation chamber are sequentially arranged from an inlet side of the cylinder body, to which the brake pedal is connected, to an inner end portion of the cylinder body.

4. The electronic brake system of claim 2, further comprising:
a first backup fluid path configured to connect the master chamber to the first hydraulic circuit;
a second backup fluid path configured to connect the first simulation chamber to the second hydraulic circuit;
a first cut-valve provided on the first backup fluid path and configured to control a flow of pressurizing medium through the first backup fluid path; and a second cut-valve provided on the second backup fluid path and configured to control a flow of pressurizing medium through the second backup fluid path.

5. The electronic brake system of claim 4, wherein:
the first hydraulic circuit includes a first inlet valve and a second inlet valve for controlling a liquid pressure supplied to a first wheel cylinder of the plurality of wheel cylinders and a liquid pressure supplied to a second wheel cylinder of the plurality of wheel cylinders, respectively, and a first outlet valve and a second outlet valve for controlling a liquid pressure discharged from the first wheel cylinder to the reservoir and a liquid pressure discharged from the second wheel cylinder to the reservoir, respectively;
the second hydraulic circuit includes a third inlet valve and a fourth inlet valve for controlling a liquid pressure supplied to a third wheel cylinder of the plurality of wheel cylinders and a liquid pressure supplied to a fourth wheel cylinder of the plurality of wheel cylinders, respectively, and a third outlet valve and a fourth outlet valve for controlling a liquid pressure discharged from the third wheel cylinder to the reservoir and a liquid pressure discharged from the fourth wheel cylinder to the reservoir, respectively; and
the second backup fluid path is provided to connect the first simulation chamber to a downstream side of the fourth inlet valve of the second hydraulic circuit.

6. The electronic brake system of claim 4, further comprising a reservoir fluid path configured to communicate the integrated master cylinder with the reservoir,
wherein the reservoir fluid path includes a first reservoir fluid path configured to communicate the master chamber with the reservoir and a second reservoir fluid path configured to communicate the first simulation chamber with the reservoir.

7. The electronic brake system of claim 6, further comprising:
a reservoir check valve provided on the first reservoir fluid path and allowing only a flow of pressurizing medium directed from the reservoir to the master chamber through the first reservoir fluid path; and
an inspection valve provided on the second reservoir fluid path and controlling a bidirectional flow of pressurizing medium through the second reservoir fluid path.

8. The electronic brake system of claim 7, wherein the second backup fluid path branches between the inspection valve and the first simulation chamber on the second reservoir fluid path.

9. The electronic brake system of claim 1, wherein the reaction piston and the damping piston each include a receiving groove recessed for at least one portion of the elastic member to be seated thereon.

10. The electronic brake system of claim 1, wherein the liquid pressure supply device includes: a first pressure chamber provided at one side of the hydraulic piston, which is movably accommodated in a cylinder block, and connected to one or more wheel cylinders of the plurality of wheel cylinders; and a second pressure chamber provided at another side of the hydraulic piston and connected to one or more other wheel cylinders of the plurality of wheel cylinders.

11. The electronic brake system of claim 10, wherein the hydraulic control unit includes: a plurality of hydraulic fluid paths for hydraulically connecting the first pressure chamber and the second pressure chamber to the first hydraulic circuit and the second hydraulic circuit; and at least one valve provided on at least one of the plurality of hydraulic fluid paths and configured to control a flow of pressurizing medium through the at least one of the plurality of hydraulic fluid paths.

12. The electronic brake system of claim 11, further comprising:
a pedal displacement sensor configured to sense the displacement of the brake pedal; and
an electronic control unit (ECU) configured to control an operation of the at least one valve on a basis of liquid pressure information and displacement information of the brake pedal.

13. The electronic brake system of claim 1, wherein the integrated master cylinder further comprises a reaction spring configured to elastically support the damping piston.

14. The electronic brake system of claim 7, further comprising an electronic control unit (ECU) configured to, in a normal operation mode:
close the first cut-valve to seal the master chamber; closing the simulator valve to seal the second simulation chamber, and close the second cut-valve while opening the inspection valve to communicate the first simulation chamber with the reservoir so that the elastic member is compressed by the reaction piston according to an operation of the brake pedal and an elastic restoring force of the elastic member is provided to a driver as a pedal feel.

15. The electronic brake system of claim 7, further comprising an electronic control unit (ECU) configured to, in an abnormal operation mode:
open the first-cut-valve to communicate the master chamber with the first hydraulic circuit, and close the inspection valve while opening the simulator valve and the second cut-valve to communicate the first simulation chamber and the second simulation chamber with the second hydraulic circuit; and
a provide pressurizing medium from the master chamber to the first hydraulic circuit through the first backup fluid path according to a stepping force of the brake pedal, provide pressurizing medium from the first simulation chamber to the second hydraulic circuit through the second backup fluid path, and provide pressurizing medium from the second simulation chamber to the second hydraulic circuit by sequentially passing through the simulation fluid path and the second backup fluid path.

* * * * *